(12) United States Patent
Piehler

(10) Patent No.: US 9,709,784 B2
(45) Date of Patent: Jul. 18, 2017

(54) OPTICAL ELEMENT AND DEVICE FOR GENERATING AN OPTICAL LINE PATTERN

(71) Applicant: Sypro Optics GmbH, Jena (DE)

(72) Inventor: Eberhard Piehler, Lehesten OT Nerkewitz (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

(21) Appl. No.: 15/094,068

(22) Filed: Apr. 8, 2016

(65) Prior Publication Data

US 2016/0306178 A1    Oct. 20, 2016

(30) Foreign Application Priority Data

Apr. 15, 2015 (DE) .................. 10 2015 105 738

(51) Int. Cl.

| G02B 17/08 | (2006.01) |
|---|---|
| G02B 27/09 | (2006.01) |
| G02B 26/10 | (2006.01) |
| G02B 3/04 | (2006.01) |
| G02B 19/00 | (2006.01) |
| G02B 26/08 | (2006.01) |
| G02B 3/00 | (2006.01) |

(52) U.S. Cl.
CPC ............. G02B 17/08 (2013.01); G02B 3/04 (2013.01); G02B 19/0052 (2013.01); *G02B 26/105* (2013.01); G02B 27/0955 (2013.01); *G02B 26/0833* (2013.01); *G02B 2003/0093* (2013.01)

(58) Field of Classification Search
USPC .................... 359/726–732, 742, 743
See application file for complete search history.

(56) References Cited

U.S. PATENT DOCUMENTS

| 5,808,775 A | 9/1998 | Inagaki et al. |
|---|---|---|
| 6,215,598 B1 | 4/2001 | Hwu |
| 2004/0247011 A1 | 12/2004 | Okazaki et al. |
| 2010/0165471 A1* | 7/2010 | Yorita ................. B29C 33/3857 359/627 |
| 2014/0328075 A1 | 11/2014 | De Lamberterie et al. |

* cited by examiner

*Primary Examiner* — Darryl J Collins

(74) *Attorney, Agent, or Firm* — Volpe and Koenig, P.C.

(57) ABSTRACT

Described is an optical element and a device for generating an optical line pattern. The optical element and a device having such an optical element comprise a first optical surface and a second optical surface which comprises a plurality of cylinder-shaped partial areas which extend along a first direction (X) and are stacked along a second direction (Y). The second direction (Y) extends vertically to the first direction (X), and an optical axis (Z) extends vertically to the first direction (X) and vertically to the second direction (Y), where at least 60% of the surface of the cylinder-shaped partial areas is oriented in such a way that a normal vector arranged on the surface extends to a side facing away from the optical axis (Z) and to a side facing away from the first optical surface.

15 Claims, 5 Drawing Sheets

OPTICAL ELEMENT AND DEVICE FOR GENERATING AN OPTICAL LINE PATTERN

CROSS REFERENCE TO RELATED APPLICATION

This application claims the benefit of German Patent Application No 10 2015 105 738.7 filed on Apr. 15, 2015, which is incorporated by reference as if fully set forth.

FIELD OF INVENTION

The present invention relates to an optical element and a device for generating an optical line pattern.

BACKGROUND

Modules for gesture recognition become more and more important in various application areas.

There are different solution approaches for this technology, one of which is the scanning of a field with a line or a strip of a radiation. Typically, the line or the strip is generated by infrared light. The radiation is scattered at the objects in the scanned space and captured by a camera system. Then, this information is evaluated, partially as 2-D-information and partially as 3-D-information.

Several types come into consideration as a light source. Especially, laser diodes are of great interest for these applications. Laser diodes can be constructed to be very small and are efficient radiation sources. Particularly, compact modules are of special interest because the modules are to be installed, for example, in laptops, smartphones or other devices of information technology.

A solution in the state of the art consists in a laser diode generating a radiation (in the IR range) incident on an optical element having two effective surfaces, wherein the first (rotationally symmetric, and often aspheric) surface collimates the radiation and the second (often also aspheric) surface is formed as a "cylinder" with a positive refractive power and generates a line or a strip. A micromechanical mirror is arranged behind the focal point or the focal line of the cylindrical surface, which realizes the scanning of the line which will then propagate divergently into the space.

The above-mentioned structure may, in fact, realize a very compact module, but it is not possible to obtain uniform line intensity. A uniform line intensity may be obtained for a given radiation characteristic of the source by an appropriate design of the cylinder geometry, but the practice shows that the laser diodes have relatively strong fluctuations in their radiation pattern which then will result in strong fluctuations in the intensity over the line, particularly, if a large portion of the diode radiation shall be used for the line generation.

A further problem in using a single cylinder surface is that it generates a focal line in the space whose width is a few hundredths millimeters in the focus (viewed for a pupil in a distance of 100 mm with an extension of 7 mm). Thus, the current demands on the eye security of the module reduce the performance of the light source which, in turn, is critical for the detection of the signal.

By default, the problem of uniform line intensity is solved by using not a single cylinder surface but a stack or an array of cylinder surfaces, each single cylinder surface distributing the radiation on the line. This approach permits to achieve a good homogenization for different radiation patterns. Nevertheless, the beam cross section behind the cylinder lens stack is increased. Therefore, disadvantageously, a larger surface is required for the deflection mirror for scanning the radiation in the space, which can hardly be realized in practice.

Conventional devices for generating a line or strip pattern for gesture recognition using a pivotable micromechanical mirror (also referred to as "Micro electro mechanical systems" (Mems)) are schematically illustrated in FIGS. 1 and 2.

The devices for generating a line pattern according to FIGS. 1 and 2 comprise a diode laser 30 and a lens 20. The first surface of the lens 20 collimates the light exiting divergently from the laser 30. The collimated light passes through the second surface of the lens 20 which, due to its cylindrical form, generates a line or a spatially extended strip in the image plane 56 from the collimated radiation. When using a single cylinder surface of FIG. 1, a line shaped focus is generated in the region of the optical axis. The line-shaped radiation propagates divergently in the space behind the focus and generates a finitely propagated line or strip pattern in the region of a plane 50 at which, for example, an object for gesture recognition may be located. From the backscattering of an object located in the region of the plane 50, if necessary, one can infer the structure of the object and the face structures (gestures) that may be present in the object. To detect objects located outside the plane 50, a micromechanical mirror 40 is arranged behind the line-shaped focus, which accomplishes the scanning of the line pattern in the space. In the present case, the rotation axis of the micromechanical mirror 40 is vertical to the optical axis in the plane of the paper. Thus, in fact, the line pattern is not—as schematically illustrated—projected onto the plane 50 but rather into the space by the mirror 40. In this respect, the plane 50 serves only for illustrating the beam course formed behind the lens 20 without the mirror 40. The nominal tilt angle of the mirror with respect to the optical axis is usually in the range of 40 to 50 degrees, and the mirror tilts about this average in the range of +/−10 to +/−25 degrees.

As mentioned above, the use of a single cylinder surface of FIG. 1 is disadvantageous insofar as hereby, on the one hand, the fluctuations of the intensity of the laser diode 30—as viewed with respect to the radiation angle of the laser diode—will affect substantially the line pattern and, on the other hand, the demands on the eye security will result in an unwanted limitation of the intensity of the laser diode 30. This, in turn, is critical for the detection of the backscattered signal (higher demands on the detector).

The use of a cylinder lens stack of FIG. 2 has the important disadvantage that it causes an important increase of the beam cross section behind the cylinder surface stack because not a single line-shaped focus is generated in the region of the optical axis (FIG. 1), but a plurality of line-shaped focuses (FIG. 2) whose respectively divergent partial radiations will then overlap to form a strip. Disadvantageously, this requires a larger surface for the deflection mirror 40 for scanning the radiation in the space, which can hardly be realized in devices such as smartphones and places great demands on the deflection mirror 40.

Further U.S. Pat. No. 5,808,775 A, US 2004/0247011 A1, U.S. Pat. No. 6,215,598 B1 and US 2014/0328075 A1 disclose lenses having an optical surface comprising a plurality of cylinder-shaped partial areas.

SUMMARY

It is therefore an object of the present invention to provide an optical unit and a device for generating an optical line or strip pattern in which, on the one hand, fluctuations of the relative laser intensity via the radiation angle of a laser diode result to a lesser degree in fluctuations in the generated line pattern, and in which, on the other hand, relatively lower demands are to be placed on the size of a deflection mirror used for scanning to generate the line pattern.

These objects are achieved according to the invention by the features of claims 1 and 7. Advantageous embodiments of the invention are set forth in the appended claims.

The idea of the present invention is to achieve a better homogenization for the line pattern at different radiation patterns and lower demands on the eye security by a specific design of the multi-cylindrical exit surface of the optical element. In this case, the exit surface is divided into several cylinder-shaped sections, wherein the cylinder-shaped partial areas are oriented on a respective side of the optical axis (or—where present—a symmetry plane) in such a way that light passing therethrough is projected mostly, preferably completely, onto the opposite side of the symmetry plane/optical axis or into the respective region of the line pattern. Such an arrangement of cylinder-shaped partial areas which only project parts of the line pattern allows for the reducing of the intensity fluctuation due to the overlapping of several sections of the radiation. Further, the beam cross section hardly changes by the specific design of the contour of the exit surface of the optical element. Several focus lines are generated behind the exit surface, so that the radiation emanates from an extended region and demands on the eye security can be met despite a relatively high radiation intensity of the light source. It is particularly advantageous that a relatively small deflection mirror can be used for scanning the radiation in the space because, due to the inventive orientation of the cylinder-shaped sections (which totally or mostly deflect the light in the direction of the optical axis), the beam cross section behind the exit surface is smaller than in a conventional cylinder lens stack in which the radiation is directed toward the optical axis as well as away from the optical axis by the cylinder-shaped surfaces.

The gist of the invention therefore is an exit surface of the optical element having a plurality of different cylinder-shaped partial areas which project the radiation (mostly or) only into such portions of the line pattern which are located on the opposite side of a symmetry plane (or a plane defined by the optical axis and an axis which is parallel to the longitudinal extent of the cylinder surfaces). In contrast, the radiation is projected (almost) uniformly into regions (of the line pattern) "above" and "below" the optical axis (or a symmetry plane) by a conventional cylinder lens stack.

In order to realize a projection of portions of the line pattern into regions which are respectively opposed to the symmetry plane, the present invention proposes that the cylinder-shaped partial areas are oriented in such a way that a normal vector arranged on the surface extends mainly away from the optical axis in the direction of light propagation. In contrast, the cylinder-shaped partial areas of a conventional cylinder lens stack are oriented in such a way that a half of the normal vector arranged on the surface extends away from the optical axis and the other half of the normal vector extends toward the optical axis in the direction of light propagation, except the apex lines where the vector extends parallel to the optical axis.

According to one aspect of the present invention, the optical element according to the invention comprises a first optical surface and a second optical surface, wherein the second surface comprises a plurality of cylinder-shaped partial areas which extend along a first direction and are stacked along a second direction, wherein the second direction extends vertically to the first direction, wherein an optical axis extends vertically to the first direction and vertically to the second direction, wherein at least 60% of the surface of the cylinder-shaped partial areas is oriented in such a way that a normal vector arranged on the surface extends to a side facing away from the optical axis as well as to a side facing away from the first optical surface.

In an embodiment, preferably at least 65%, more preferably at least 70%, even more preferably at least 75%, even more preferably at least 80%, even more preferably at least 85%, even more preferably at least 90%, even more preferably at least 95%, and even more preferably at least 99% of the surface of the cylinder-shaped partial areas is oriented in such a way that a normal vector arranged on the surface extends to a side facing away from the optical axis and to a side facing away from the first optical surface. Particularly preferably, the overall surface of the cylinder-shaped partial areas (except existing apex lines, if any) is oriented in such a way that a normal vector arranged on the surface either extends parallel to the optical axis or to a side facing away from the optical axis as well as to a side facing away from the first optical surface.

In an embodiment, the first optical surface is a rotationally symmetric surface and the optical axis coincides with the rotation axis.

In an embodiment, the second optical surface is formed mirror-symmetrically, wherein the symmetry plane extends parallel to the first direction and vertically to the second direction and the optical axis is in the symmetry plane. In other words, a symmetry plane of the second optical surface preferably extends through the rotation axis of the first optical surface and extends parallel to the first direction which corresponds to the longitudinal extent of the cylinder-shaped partial areas.

In an embodiment, the number of cylinder-shaped partial areas is uneven. In an embodiment, the number of cylinder-shaped partial areas is between 3 and 13, more preferably between 3 and 7. In an embodiment, a cross section of the cylinder-shaped partial areas is formed aspherically.

In an embodiment, at least one of the cylinder-shaped partial areas (more preferably all cylinder-shaped partial areas) is (are) oriented in such a way that the light is projected totally (with respect to the symmetry plane or the optical axis) onto the opposed site of the line pattern after passing through the partial areas. In an embodiment, at least one of the cylinder-shaped partial areas (more preferably all cylinder-shaped partial areas) is (are) oriented in such a way that the light generates a part of the line pattern after passing through one partial area which corresponds to half of the width of the line or strip pattern. In other words, the partial areas acting as refracting surfaces are convexly formed and oriented in such a way that the convex arc is directed away from the symmetry plane (or the optical axis), and thus the light is only projected into the part opposite the symmetry plane.

Whereas the cross sections of the cylinder-shaped partial areas of a conventional cylinder lens stack form circular arcs or aspheric arcs whose central point (i. e. a normal vector arranged there) has an orientation parallel to the optical axis, the central points of the (preferably aspheric) cross sections of the inventive cylinder-shaped partial areas have an orientation in the direction of light propagation which extends away from the optical axis. In other words, the cross sections of the inventive cylinder-shaped partial areas which are "above" the symmetry plane only have the upper halves and the partial areas which are "below" the symmetry plane only have the lower halves of the conventional arcs. Thus, the beam cross section can be reduced behind the cylinder surface stack.

In an embodiment, the apex lines of adjacent cylinder-shaped partial areas are arranged offset along the optical axis. That line-shaped section is considered as apex line of a cylinder-shaped partial area that extends furthest in the direction of light propagation along the optical axis. Particularly preferably, the apex lines of a plurality of cylinder-shaped partial areas are arranged at the boundary of an adjacent cylinder-shaped partial area. Particularly preferably, all apex lines of the cylinder-shaped partial areas are arranged in the boundary area of adjacent cylinder-shaped partial areas (except the partial areas arranged on the optical axis).

According to another aspect of the present invention, a device for generating a line pattern comprises a light source and an optical element having at least one of the above features.

In an embodiment, the light source is formed by a laser diode. In an embodiment, the light source is an infrared laser diode. In an embodiment, the light source is formed on the optical axis. In an embodiment, the first optical surface is formed to collimate the radiation of the light source. In an embodiment, a micromechanical mirror is provided. In an embodiment, the center of gravity of the micromechanical mirror is arranged on the optical axis. In an embodiment, the micromechanical mirror is arranged inside the focal length of the optical element.

In an embodiment, the diameter of the micromechanical mirror is less than the diameter of the optical element. Particularly preferably, the diameter of the micromechanical mirror is between 30 and 70% of the diameter of the optical element.

In an embodiment, the nominal tilt angle of the mirror with respect to the optical axis is in the range of 30 to 60 degrees. In a further embodiment, the nominal tilt angle of the mirror with respect to the optical axis is in the range of 40 to 50 degrees.

In an embodiment, the mirror is adapted to repeatedly tilt about said nominal tilt angle in the range of +/−10 to +/−25 degrees. The frequency for tilting back and forth may be higher than 10 Hz, and in some embodiments, the frequency may be higher than 100 Hz.

In an embodiment, the device further comprises a camera system formed to detect the radiation scattered at an object in the viewed space. In an embodiment, the device further comprises a means for determining structural data of the object from the detected radiation. In an embodiment, the device further comprises a means for recognizing gestures and/or facial shapes from the detected radiation. Here, any control information from human beings which are provided by moving hands, arms, fingers, legs, the head or facial expressions or the like is considered as gestures.

According to still another aspect of the present invention, an optical unit is disclosed, comprising: an optical element and a mirror, wherein the optical element comprises: a first optical surface, and a second optical surface which comprises a plurality of cylinder-shaped partial areas which extend along a first direction and are stacked along a second direction, wherein the second direction extends vertically to the first direction, and wherein an optical axis extends vertically to the first direction and vertically to the second direction, wherein at least 60% of the surface of the cylinder-shaped partial areas is oriented in such a way that a normal vector arranged on the surface extends to a side facing away from the optical axis as well as to a side facing away from the first optical surface, wherein a diameter of the micromechanical mirror is smaller than a diameter of the optical element.

In an embodiment, the mirror is arranged in a distance from the optical element is smaller than a focal length of the optical element.

In a further embodiment, a distance of the mirror from the optical element is smaller than a focal length along a first direction where the cylindrical shape has no impact on the focal length while said distance of the mirror from the optical element is larger than a focal length along a second direction where the cylindrical shape has full impact on the focal length. First and second directions extend perpendicular to each other. According to embodiments, first and second directions both extend perpendicular to the optical axis.

In a further embodiment, a diameter of the micromechanical mirror is smaller than 60% of a diameter of the optical element.

In an embodiment, a distance between the mirror and the optical element is smaller than a diameter of the optical element.

In an embodiment, a distance between the mirror and the optical element is smaller than a diameter of the mirror.

In an embodiment, a distance between the mirror and the optical element is smaller than 5 mm, more preferably smaller than 3 mm and still more preferably smaller than 1.5 mm.

In an embodiment, the mirror is a planar mirror.

In an embodiment, the mirror is a micromechanical mirror.

In an embodiment, no other element intervenes between the mirror and the optical element. In other words, the space between the mirror and the optical element is filled with vacuum or an optically transparent gas such as air.

In an embodiment, at least 80% of the surface of the cylinder-shaped partial areas is oriented in such a way that a normal vector arranged on the surface extends to a side facing away from the optical axis and to a side facing away from the first optical surface.

In an embodiment, the overall surface of the cylinder-shaped partial areas is oriented in such a way that a normal vector arranged on the surface extends parallel to the optical axis or to a side facing away from the optical axis as well as to a side facing away from the first optical surface.

In an embodiment, the first optical surface is a rotationally symmetric surface and the optical axis coincides with the rotation axis.

In an embodiment, the second optical surface is formed mirror-symmetrically, wherein the symmetry plane extends parallel to the first direction, vertically to the second direction, and the optical axis is in the symmetry plane.

In an embodiment, the apex lines of adjacent cylinder-shaped partial areas are arranged offset along the optical axis.

According to still another aspect of the present invention, a device for generating a line pattern is disclosed, comprising a light source, an optical element and a mirror, wherein the optical element comprises: a first optical surface, and a second optical surface which comprises a plurality of cylinder-shaped partial areas which extend along a first direction and are stacked along a second direction, wherein the second direction extends vertically to the first direction, and wherein an optical axis extends vertically to the first direction and vertically to the second direction, wherein at least 60% of the surface of the cylinder-shaped partial areas is oriented in such a way that a normal vector arranged on the surface extends to a side facing away from the optical axis as well as to a side facing away from the first optical surface, and wherein the mirror is arranged in a distance from the optical element is smaller than the focal length of the optical element.

In an embodiment, the light source is a laser diode.

In an embodiment, a micromechanical mirror is provided which is arranged inside the focal length of the optical element.

In an embodiment, a diameter of the micromechanical mirror is smaller than the diameter of the optical element.

BRIEF DESCRIPTION OF THE DRAWINGS

Hereinafter, the invention is explained in more detail referring to exemplary embodiments, where.

DETAILED DESCRIPTION OF THE PREFERRED EMBODIMENTS

Figure 3:
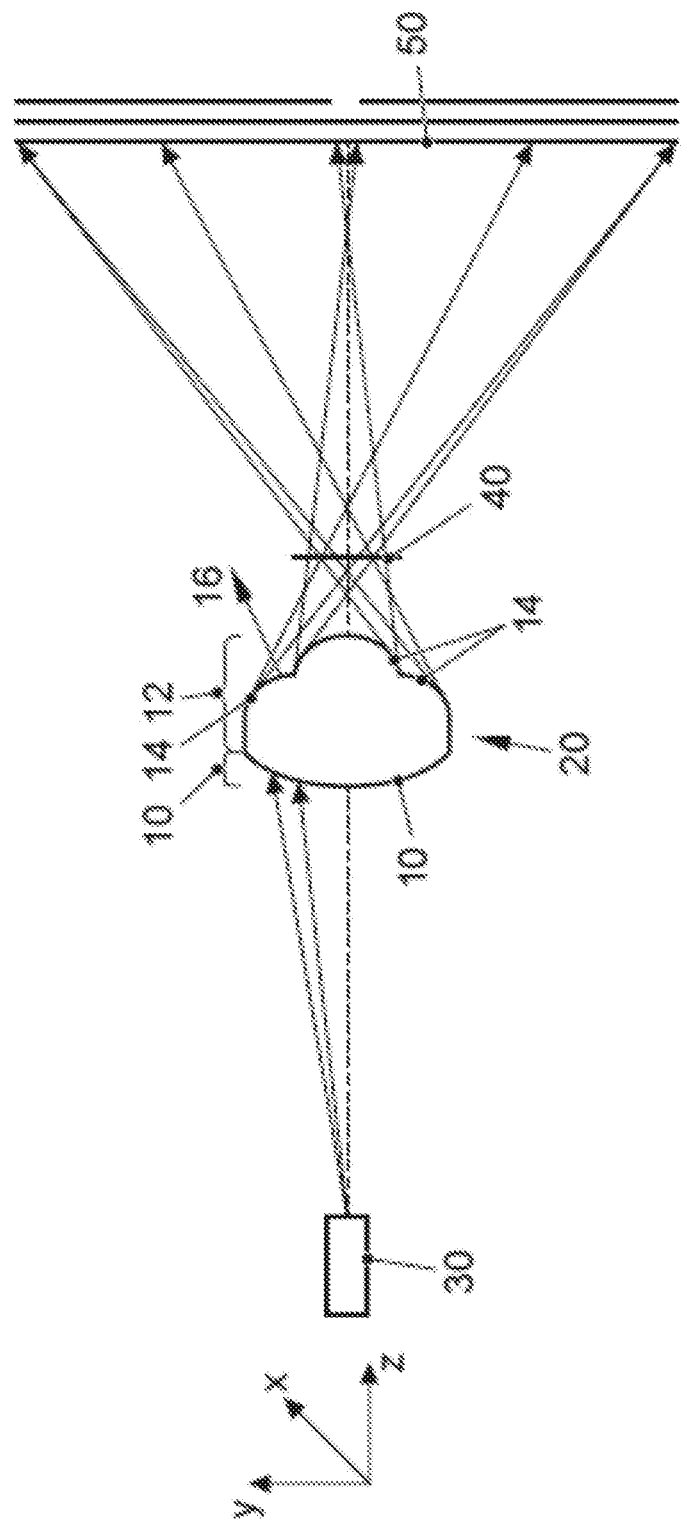
FIG. 3 shows a schematic sectional view of a device for generating an optical line pattern of the invention according to a preferred embodiment variant.

FIG. 3 shows a schematic sectional view of a device for generating an optical line or strip pattern of the invention according to a preferred embodiment variant.

Figure 1:
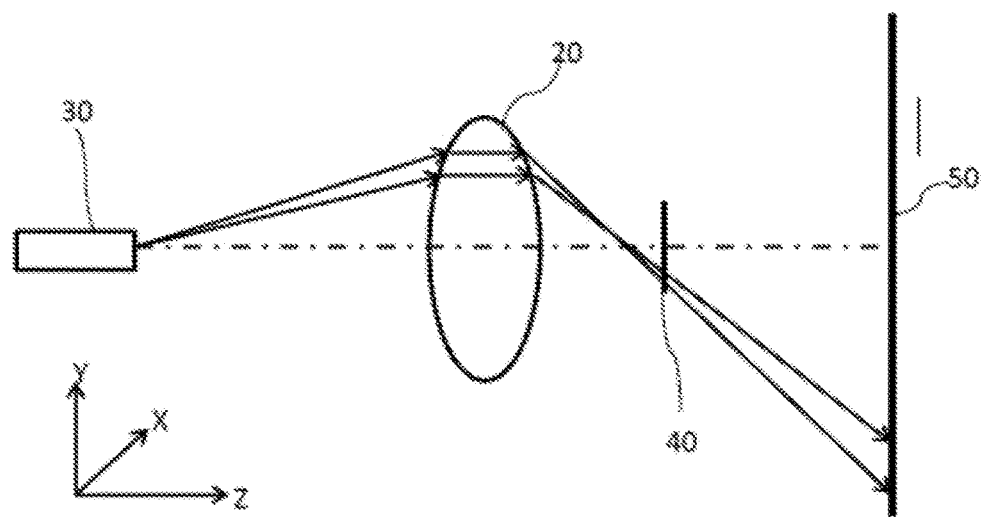
FIG. 1 shows the schematic sectional view of a conventional device for generating an optical line pattern having a single cylinder lens.
Figure 2:
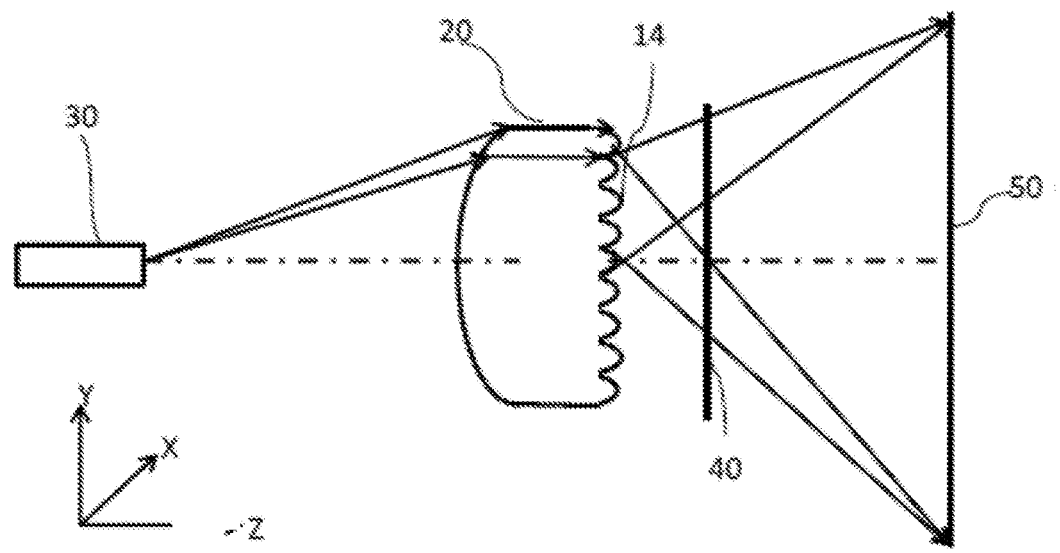
FIG. 2 shows a schematic sectional view of a conventional device for generating an optical line pattern having a cylinder lens stack.

The device comprises a diode laser 30 whose radiation has a certain divergence in the X-direction and in the Y-direction. In order to generate a line pattern which, for example, can be used for gesture recognition, an optical element 20 is provided which comprises a first rotationally symmetric aspheric surface 10 and a second surface 12. The second surface 12 comprises three cylinder-shaped partial areas 14. The cylinder shaped partial areas do not form a solid cylinder but only a part of a solid cylinder, wherein the cross section of the surface is formed aspherically. The second surface 12 which has the three cylinder-shaped partial areas 14 is formed symmetrically with respect to a symmetry plane which extends through the optical axis Z and extends vertically to the Y-plane (plane of the paper). According to the invention, the partial areas 14 are formed and arranged in such a way that normal vectors 16 arranged on the surface of the partial areas 14 are always directed away from the optical axis Z in the direction of light propagation Z. Accordingly, the aspheric arcs shown in the sectional view are oriented in such a way that they are directed away only from the optical axis Z. Thus, the radiation of the diode laser 30 collimated by the aspheric surface 10 can be directed onto the half of the opposite side of the line 50 by the partial areas 14. The fluctuation of the radiation pattern of the laser diode 30 is reduced due to the overlapping of several sections (partial areas 14) of the radiation. Several focus lines are generated following the partial areas 14, so that the radiation emanates from an extended region and so that the demands on the eye security can be met even when the performance of the laser diode 30 is high in comparison to a single cylinder lens (FIG. 1). Additionally, a significantly smaller deflection mirror 40 can be used due to the reduced beam cross section in comparison to a conventional cylinder lens stack (FIG. 2), whose rotation axis is in the Y-plane (plane of the paper) and which is formed to accomplish the scanning of the line pattern in the space. That is, the diameter of the deflection mirror 40 is smaller than the diameter of the optical element 20. In the present embodiment, said condition is valid for both, the x-direction and the y-direction. However, in further embodiments it can be sufficient that the diameter of the deflection mirror 40 is smaller than the diameter of the optical element 20 along only one of x-direction and y-direction.

In contrast to a conventional cylinder lens stack (FIG. 2), those parts of the partial areas 14 are omitted which direct the radiation away from the optical axis, which leads to an increase of the beam cross section.

The data of a concrete preferred exemplary embodiment are represented in table 1 below.

TABLE 1

| Radii | Thickness and air gaps | Refractive indices $n_e$ | Abbe number $v_e$ |
|---|---|---|---|
| Laser diode infinite | 2.212 | | |
| R1 = 1.252 (*) | d1 = 2.021 | n1 = 1.5882 | v1 = 29.8 |
| R2 = −0.259 (**) | d2 = 1.17 | | |
| Mirror | | | |

(*) rotationally symmetric asphere with conic constant k = −2.452 Sagitta $z = (h^2/R)/(1 + ROOT(1 - (1 + k) * (h/R)^2))$ h—radial distance to the axis
(**) aspheric cylinder surfaces Cylinder geometry in the y-direction, i.e. the sagitta z does not depend from x Surface is composed of 3 cylinder parts central part: coefficients: R = −0.259 k = −2.112 c4 = 0.315 $z = (y^2/R)/(1 + ROOT(1 - (1 + k) * (y/R)^2)) + c4 * y\hat{\ }4$ for −0.225 < y < 0.225 exterior parts: coefficients: R = −0.22264 k = −2.7868 c4 = −0.3461 c6 = 1.3712 c8 = −2.5013 c10 = 2.1162 c12 = −6.7698 where y' = y − sign(y) * 0.225 for values y where |y| > 0.225 the sagitta is calculated: $z = -0.1149 + (y^2/R)/(1 + ROOT(1 - (1 + k) * (y'/R)^2)) + c4 * y\hat{\ }4 + c6 * y\hat{\ }6 + 8 * y\hat{\ }8 + c10 * y\hat{\ }10 + c12 * y\hat{\ }12$.

Due to the fact that the optical element 20 comprises cylindrical surfaces, there exist different focal lengths (measured along z-direction) along x-direction and y-direction. For example, in the present embodiment of FIG. 3, the focal length along x-direction is approximately 2.2 mm and the focal length along y-direction is approximately 0.884 mm. The mirror 40 is arranged at a distance from the optical element 20 smaller than a focal length of the optical element 20 which extends along a direction in which the cylindrical shape has no impact on the focal length, i.e. along x-direction. In the present embodiment, a distance of the mirror 40 from the optical element 20 is smaller than the focal length along x-direction (where the cylindrical shape has no impact on the focal length) while said distance of the mirror 40 from the optical element 20 is larger than the focal length along y-direction (where the cylindrical shape has full impact on the focal length).

Figure 4:
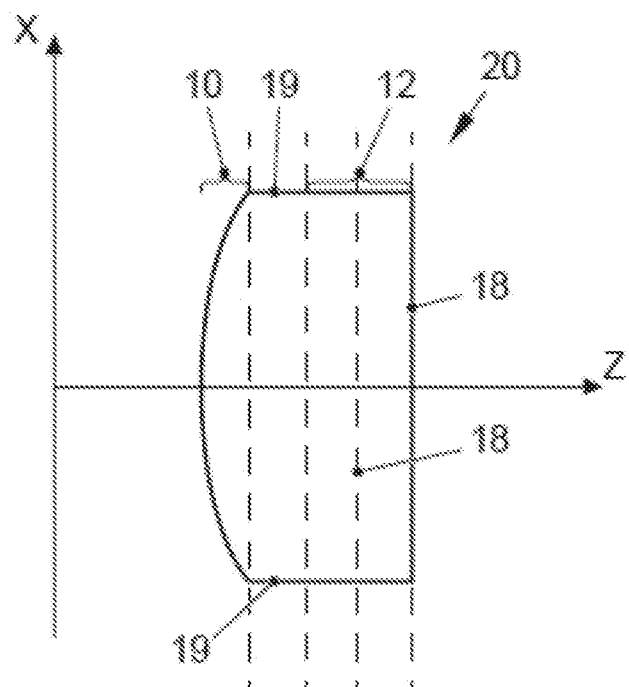
FIGS. 4 and 5 show a schematic sectional view of an optical element having three symmetrically arranged partial areas of the invention according to a first preferred embodiment variant.
Figure 5:
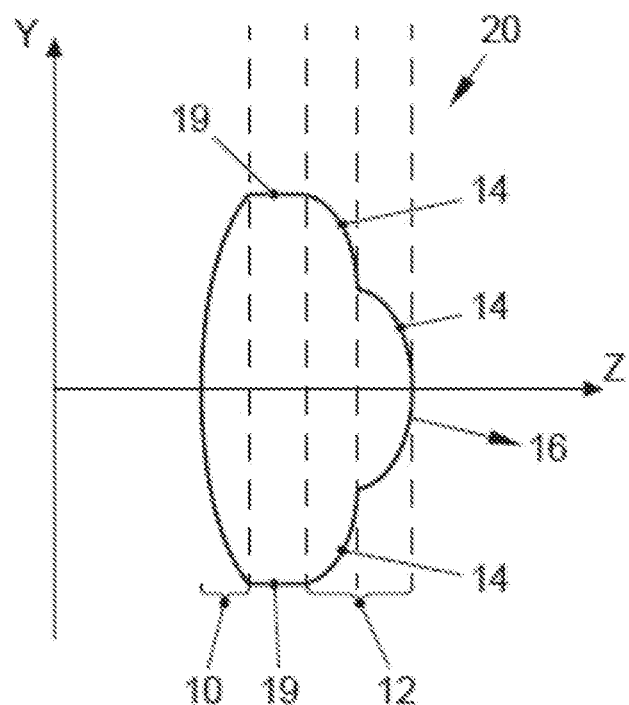

FIGS. 4 and 5 respectively show a sectional view of the optical element according to the invention of the device disclosed in FIG. 3 in detail (shown in the X-Z-plane in FIG. 4, and shown in the Y-Z-plane in FIG. 5).

It can be seen that the first surface 10 is formed rotationally symmetric, whereas the second surface comprises three cylinder-shaped partial areas 14. A mount 19 is respectively provided at the upper surface and the lower surface of the optical element 20. The optical element 20 is formed mirror-symmetrically both in the X-Z-plane and in the Y-Z-plane. All cylinder-shaped partial areas 14 are oriented in such a way that a normal vector 16 arranged on the surface extends always away from the optical axis Z in the Z-direction. So, the respective refracting partial area 14 can direct the radiation in the respective other half of the X-Z-plane. Since radiation portions extending away from the optical axis Z from the second surface 12 can be prevented (or reduced), the size of a deflection mirror (40 in FIG. 3) used for scanning can be reduced.

Figure 6:
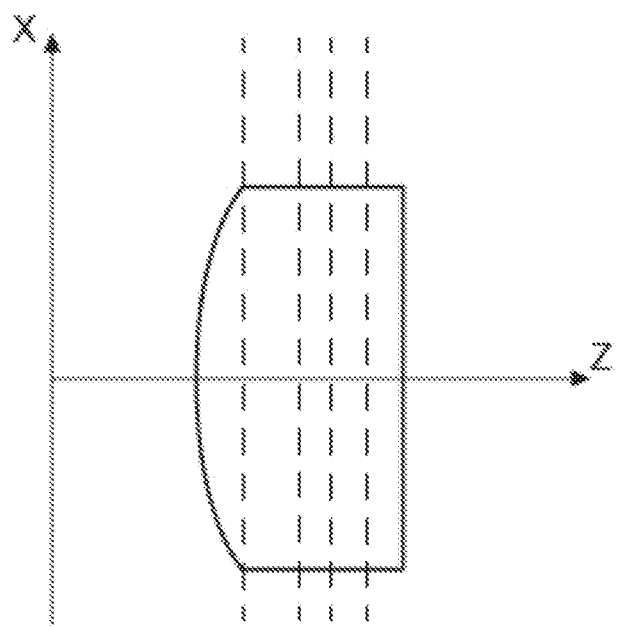
FIGS. 6 and 7 show a schematic sectional view of an optical element having five symmetrically arranged partial areas of the invention according to a second preferred embodiment variant.
Figure 7:
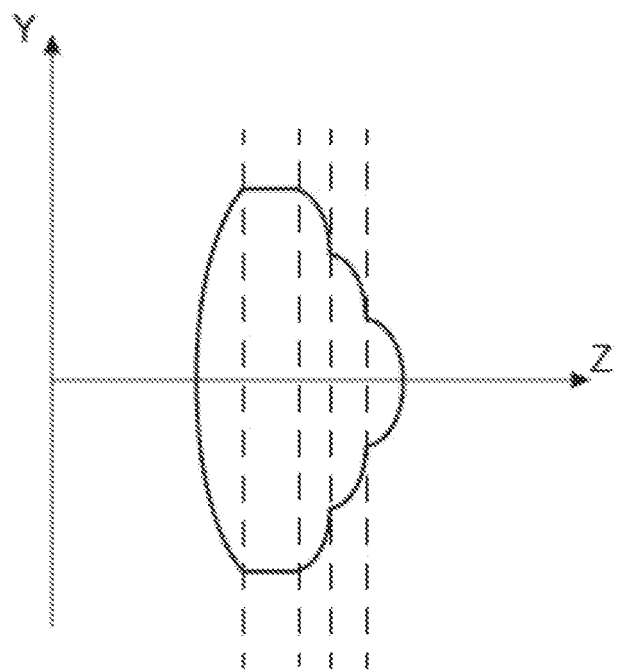

FIGS. 6 and 7 respectively show a sectional view of another optical element according to the invention (shown in the X-Z-plane in FIG. 6, and shown in the Y-Z-plane in FIG. 7).

In comparison to the optical element disclosed in FIGS. 4 and 5, the optical element 20 shown here has five partial areas 14 that are arranged mirror-symmetrically, respectively. In both exemplary embodiments, the apex lines 18 of the respective partial areas 14 are arranged offset along the Z-axis, which allows for the realization of a particularly compact and efficient configuration. Particularly preferably, the apex lines 18 of the partial areas 14 line up with the upper/lower ends of the adjacent partial areas 14, respectively. Only the apex line 18 of the central partial area 14 is not in contact with an adjacent partial area 14. Particularly preferably, a normal vector of all apex lines 18 extends parallel to the optical axis Z.

Figure 8:
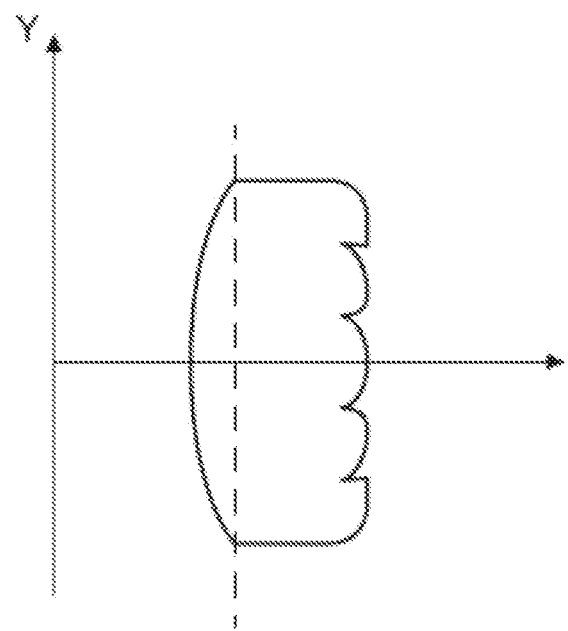
FIG. 8 shows a schematic sectional view of an optical element having five symmetrically arranged partial areas of the invention according to a third preferred embodiment variant.

FIG. 8 shows a schematic sectional view of an optical element having five symmetrically arranged partial areas 14 of the invention according to a third preferred embodiment variant.

In comparison to the optical element disclosed in FIGS. 6 and 7, the apex lines 18 of the partial areas 14 do not line up with the upper/lower ends of the adjacent partial areas 14, respectively. In fact, the apex lines 18 of the partial areas 14 are not arranged offset with respect to the Z-axis and thus indentations are required. Although the production expenses of such an optical element 20 are higher when compared to the optical element 20 disclosed in FIGS. 6 and 7, it can achieve the advantages of the invention, particularly a homogenous illumination of the line despite a varying radiation pattern of the source and a relatively small deflection mirror for scanning the line.

Figure 9:
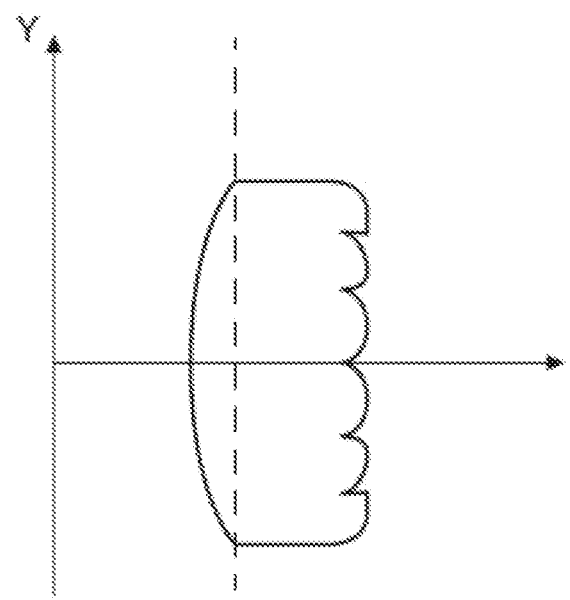
FIG. 9 shows a schematic sectional view of an optical element having six non-symmetrically arranged partial areas of the invention according to a fourth preferred embodiment variant.

FIG. 9 shows a schematic sectional view of an optical element having six non-symmetrically arranged partial areas 14 of the invention.

In comparison to the other exemplary embodiments, the partial areas in the present embodiment are not oriented in such a way that the overall surface of the cylinder-shaped partial areas 14 is oriented in such a way that a normal vector 16 arranged on a surface extends toward a side facing away from the optical axis Z. To the contrary, the third and fifth partial areas 14 (counted from above) respectively comprise also sections on the surface of which a normal vector 16 extends toward the optical axis Z. But, according to the invention, more than 60% of the surface of the cylinder-shaped partial areas 14 is oriented in such a way that a normal vector 16 arranged on the surface extends to a side facing away from the optical axis Z. Thus, most of the radiation can be directed toward the optical axis Z, so that a relatively small deflection mirror (40 in FIG. 3) can reflect most of the radiation which leads to the formation of the line pattern 50.

LIST OF REFERENCE NUMERALS 10 first optical surface
12 second optical surface
14 cylinder-shaped partial area
16 normal vector
18 apex line
19 lens mount
20 optical element
30 light source
40 micromechanical mirror
50 line pattern
X first direction
Y second direction
Z optical axis

What is claimed is:

1. An optical unit, comprising:
an optical element and a micromechanical mirror,
wherein the optical element comprises:
a first optical surface, and
a second optical surface which comprises a plurality of cylinder-shaped partial areas which extend along a first direction and are stacked along a second direction, wherein the second direction extends vertically to the first direction, and wherein an optical axis extends vertically to the first direction and vertically to the second direction,
wherein at least 60% of the surface of the cylinder-shaped partial areas is oriented in such a way that a normal vector arranged on the surface extends to a side facing away from the optical axis as well as to a side facing away from the first optical surface,
wherein a diameter of the micromechanical mirror is smaller than a diameter of the optical element.

2. The optical unit of claim 1, wherein at least 80% of the surface of the cylinder-shaped partial areas is oriented in such a way that a normal vector arranged on the surface extends to a side facing away from the optical axis and to a side facing away from the first optical surface.

3. The optical unit of claim 1, wherein the overall surface of the cylinder-shaped partial areas is oriented in such a way that a normal vector arranged on the surface extends parallel to the optical axis or to a side facing away from the optical axis as well as to a side facing away from the first optical surface.

4. The optical unit of claim 1, wherein the first optical surface is a rotationally symmetric surface and the optical axis coincides with the rotation axis.

5. The optical unit of claim 1, wherein the second optical surface is formed mirror-symmetrically, wherein the symmetry plane extends parallel to the first direction, vertically to the second direction, and the optical axis is in the symmetry plane.

6. The optical unit of claim 1, wherein apex lines of adjacent cylinder-shaped partial areas are arranged offset along the optical axis.

7. The optical unit of claim 1, wherein the micromechanical mirror is arranged at a distance from the optical element smaller than a focal length of the optical element.

8. The optical unit of claim 1, wherein a diameter of the micromechanical mirror is smaller than 60% of a diameter of the optical element.

9. The optical unit of claim 1, wherein a distance between the micromechanical mirror and the optical element is smaller than a diameter of the optical element.

10. The optical unit of claim 1, wherein a distance between the micromechanical mirror and the optical element is smaller than a diameter of the micromechanical mirror.

11. A device for generating a line pattern comprising a light source, an optical element and a micromechanical mirror,
   wherein the optical element comprises: a first optical surface, and a second optical surface which comprises a plurality of cylinder-shaped partial areas which extend along a first direction and are stacked along a second direction, wherein the second direction extends vertically to the first direction, and wherein an optical axis extends vertically to the first direction and vertically to the second direction,
   wherein at least 60% of the surface of the cylinder-shaped partial areas is oriented in such a way that a normal vector arranged on the surface extends to a side facing away from the optical axis as well as to a side facing away from the first optical surface,
   wherein the micromechanical mirror is arranged in a distance from the optical element is smaller than the a focal length of the optical element.

12. The device of claim 11, wherein the light source is a laser diode.

13. The device of claim 11 wherein the micromechanical mirror is provided which is arranged inside a focal length of the optical element.

14. The device of claim 11, wherein a diameter of the micromechanical mirror is smaller than the diameter of the optical element.

15. The device of claim 11, wherein the micromechanical mirror is tilted with respect to the optical axis of the optical element in the range of 40 to 50 degrees.

\* \* \* \* \*